(12) United States Patent
Xiong et al.

(10) Patent No.: US 12,372,486 B2
(45) Date of Patent: Jul. 29, 2025

(54) NOISE DIAGNOSTICS FOR AN ELECTRON BEAM INSPECTION SYSTEM WITH SWATHING

(71) Applicant: KLA Corporation, Milpitas, CA (US)

(72) Inventors: Bo Xiong, Milpitas, CA (US); Hedong Yang, Santa Clara, CA (US); Kay Wang, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 432 days.

(21) Appl. No.: 17/896,067

(22) Filed: Aug. 25, 2022

(65) Prior Publication Data

US 2024/0068967 A1  Feb. 29, 2024

(51) Int. Cl.
| | | |
|---|---|---|
| *G06T 7/13* | (2017.01) | |
| *G01N 23/2251* | (2018.01) | |
| *G06T 7/00* | (2017.01) | |
| *G06T 7/11* | (2017.01) | |
| *G06T 7/70* | (2017.01) | |

(52) U.S. Cl.
CPC ....... *G01N 23/2251* (2013.01); *G06T 7/0006* (2013.01); *G06T 7/11* (2017.01); *G06T 7/13* (2017.01); *G06T 7/70* (2017.01); *G01N 2223/07* (2013.01); *G01N 2223/418* (2013.01); *G01N 2223/507* (2013.01); *G01N 2223/6116* (2013.01); *G06T 2207/10061* (2013.01); *G06T 2207/20132* (2013.01); *G06T 2207/30148* (2013.01)

(58) Field of Classification Search
CPC ........... G01N 23/2251; G01N 2223/07; G01N 2223/418; G01N 2223/507; G01N 2223/6116; G06T 7/0006; G06T 7/11; G06T 7/13; G06T 7/70; G06T 2207/10061; G06T 2207/20132; G06T 2207/30148

See application file for complete search history.

(56) References Cited

U.S. PATENT DOCUMENTS

| | | | | |
|---|---|---|---|---|
| 6,636,064 B1 * | 10/2003 | Satya | ................. | G01N 21/9501 |
| | | | | 324/762.01 |
| 6,771,806 B1 * | 8/2004 | Satya | ................... | G01N 21/956 |
| | | | | 324/754.22 |
| 6,992,290 B2 * | 1/2006 | Watanabe | ............... | H01J 37/28 |
| | | | | 250/310 |
| 7,932,494 B2 * | 4/2011 | Zhang | ................... | H01J 37/261 |
| | | | | 250/306 |

(Continued)

FOREIGN PATENT DOCUMENTS

| WO | 20210038633 A1 | 3/2021 | | |
|---|---|---|---|---|
| WO | WO-2021038633 A1 * | 3/2021 | ......... | G01N 21/8851 |

OTHER PUBLICATIONS

WIPO, International Search Report for International Application No. PCT/US2023/030755, Dec. 13, 2023.

*Primary Examiner* — Roy M Punnoose
(74) *Attorney, Agent, or Firm* — Hodgson Russ LLP (57) ABSTRACT

Parameters from an inspection image representing mechanical vibrations and electromagnetic interference can be determined. An X-direction vibration spectrum can be determined based on the X-direction offsets. A Y-direction vibration spectrum can be determined based on the Y-direction offsets. The determinations can be based on a swath image of a workpiece, such as a semiconductor wafer or reticle.

20 Claims, 8 Drawing Sheets

(56) References Cited

U.S. PATENT DOCUMENTS

| | | | |
|---|---|---|---|
| 8,086,021 B2 * | 12/2011 | Ominami | H01J 37/222 |
| | | | 382/141 |
| 11,222,799 B2 * | 1/2022 | Kang | H01L 21/67288 |
| 2010/0224792 A1 * | 9/2010 | Zhang | H01J 37/261 |
| | | | 702/56 |
| 2014/0193065 A1 | 7/2014 | Chu et al. | |
| 2015/0348747 A1 * | 12/2015 | Ohashi | H01J 37/28 |
| | | | 250/310 |
| 2018/0019097 A1 * | 1/2018 | Harada | G01N 23/22 |
| 2018/0328860 A1 | 11/2018 | Suman et al. | |
| 2019/0115236 A1 * | 4/2019 | Kang | G01N 21/8851 |
| 2022/0084856 A1 | 3/2022 | Hiroi et al. | |

* cited by examiner

NOISE DIAGNOSTICS FOR AN ELECTRON BEAM INSPECTION SYSTEM WITH SWATHING

FIELD OF THE DISCLOSURE

This disclosure relates to inspection of workpieces.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

Electron beam inspection is frequently used in semiconductor metrology for high-resolution microscopic inspection of layers in a semiconductor device. Electron beams have several advantages over other mechanisms to inspect or otherwise examine samples. Light beams have an inherent resolution limitation of about 100 nm to 200 nm, but electron beams can investigate feature sizes as small as a few nanometers.

One particular problem with electron beam inspection systems is system noise in the acquired images caused by system disturbances. Specifically, mechanical vibrations such as tool jitters and electromagnetic interferences can affect inspection. It may be advantageous to obtain the frequencies associated with such vibrations, which may then be used as a tool diagnostic for troubleshooting electron beam inspection tools. Tool vibration frequencies and amplitudes can be measured during a step-and-settle mode of operation of an electron beam inspection tool, but it requires the electron beam to scan over a straight edge pattern of the wafer where the scanning direction is perpendicular to the edge. Furthermore, the technique also requires the stage to be stationary while scanning is performed. This technique cannot be applied to a swath mode of operation where the electron beam scans in a raster pattern while the stage and wafer move at constant velocity.

Another technique to measure the vibration frequencies based on swath images is to use kernel alignment. This technique detects kernels' position offset versus time in a swath image. This method is disadvantageous because it is sensitive to the swath images' pattern, dimension, and distortion. Furthermore, this method is computationally expensive. It can take more than ten minutes to complete a single image, which when combined to large swath images can be disruptive to inspection throughput.

Thus, there exists a need for a solution to obtain system noise (including mechanical vibration and electromagnetic interference (EMI)) information from an inspection tool during beam swathing imaging mode to diagnose tool vibration-related image quality problems.

BRIEF SUMMARY OF THE DISCLOSURE

A system is provided in a first embodiment. The system includes a particle beam source that generates a beam of particles (e.g., electrons); a stage configured to hold a workpiece in a path of the beam of particles; a detector configured to receive the beam of particles reflected from the workpiece; and a processor in electronic communication with the detector. The processor is configured to receive an image of a workpiece; determine an X-direction profile of the image; determine X-direction offsets for the semiconductor wafer between a nominal cell size and the profile; and determine an X-direction vibration spectrum based on the X-direction offsets. The image includes an array of a pattern on the workpiece. The X-direction profile includes edges of the pattern across the X-direction.

The processor can be further configured to crop the image to a swath of the pattern. The swath in the image can include more than one column in the array.

The processor can be further configured to determine a Y-direction profile of the image; determine Y-direction offsets for the workpiece between a nominal line and the profile; and determine a Y-direction vibration spectrum based on the Y-direction offsets. The Y-direction profile includes edges of the pattern across the Y-direction. The Y-direction is perpendicular to the X-direction. A swath in the image can include more than one row in the array.

The processor also can be further configured to average the X-direction vibration spectrum and the Y-direction vibration spectrum and to determine a vibration frequency for the system from the averaging.

The workpiece can be a semiconductor wafer or a reticle.

A method is provided in a second embodiment. The method includes receiving at a processor an image of a workpiece generated by an inspection system. The image includes an array of a pattern on the workpiece. Using the processor, an X-direction profile of the image is determined. The X-direction profile includes edges of the pattern across the X-direction. Using the processor, X-direction offsets for the workpiece between a nominal cell size and the profile are determined. Using the processor, an X-direction vibration spectrum is determined based on the X-direction offsets.

The method can further include generating the image using the inspection system.

The inspection system can be a scanning electron microscope.

The method can include cropping the image to a swath of the pattern using the processor. The swath in the image can include more than one column in the array.

Figure 3:
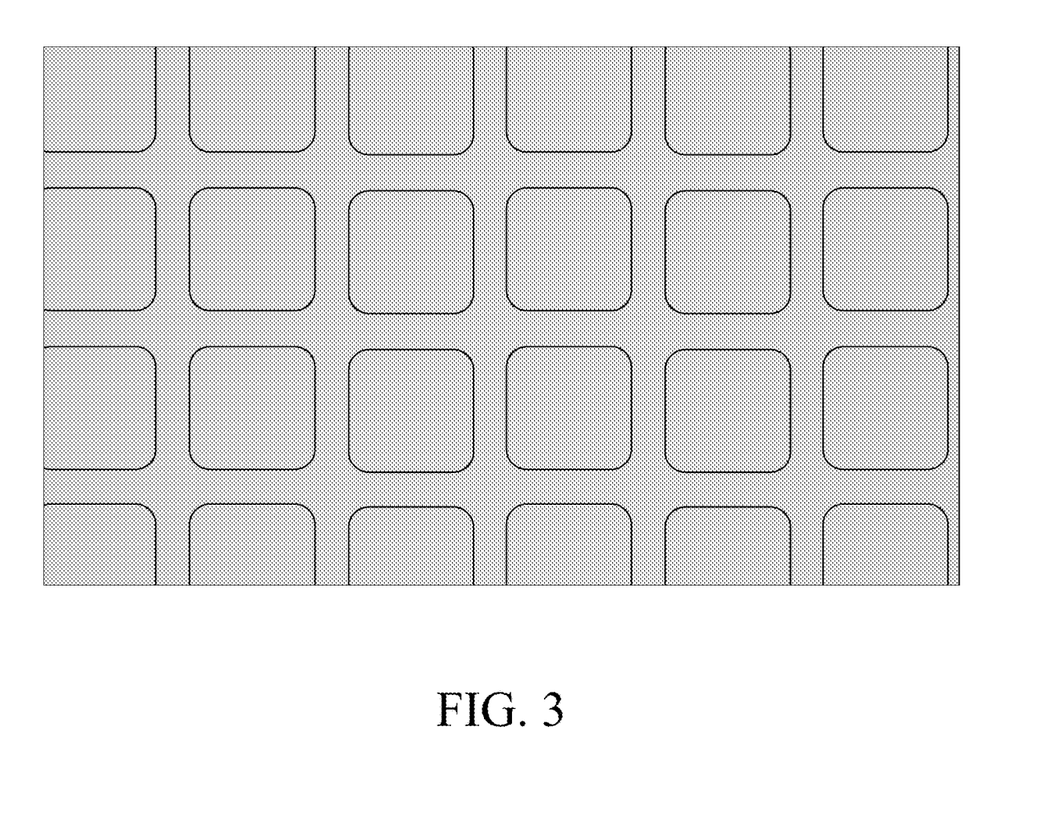
FIG. 3 is an illustration of array patterns of a semiconductor wafer.
Figure 6:
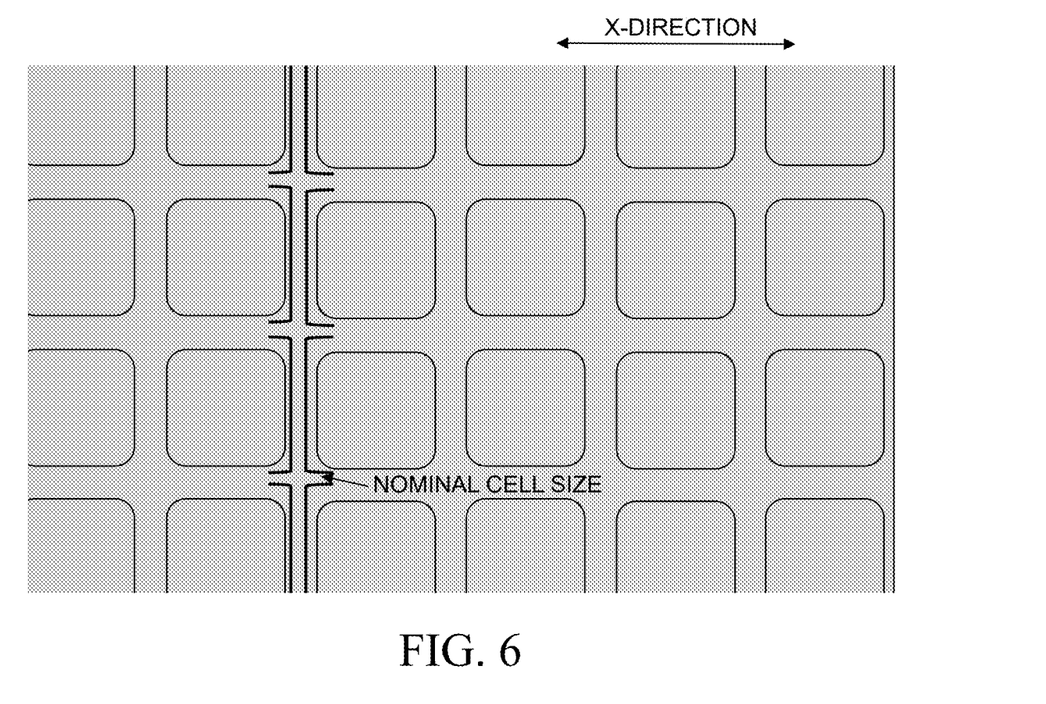
FIG. 6 shows an illustration of vertical edge detection during X-direction scan.
Figure 9:
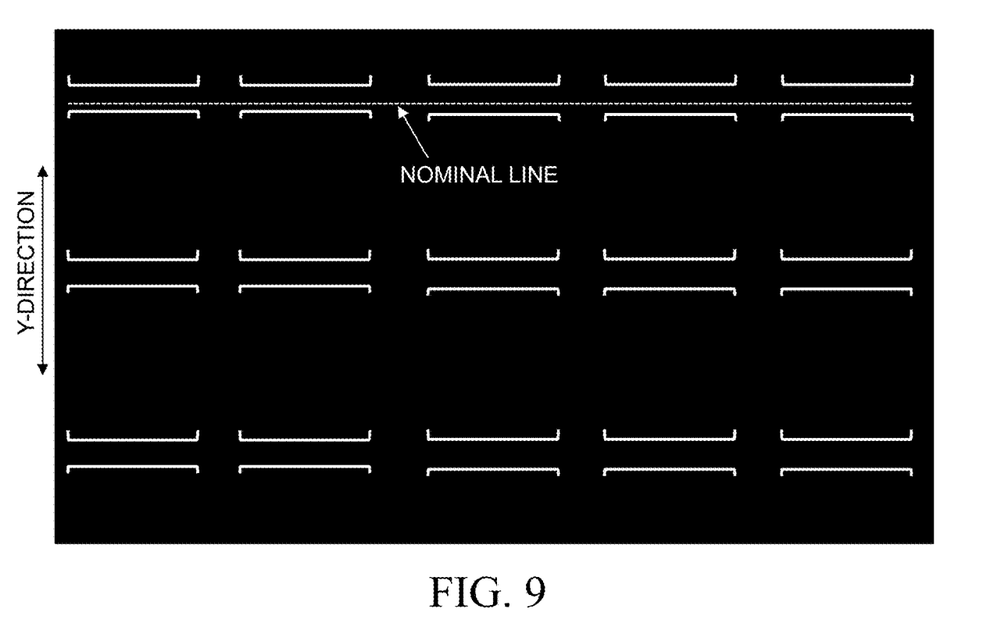
FIG. 9 shows an illustration of horizontal edge detection during Y-direction scan.

The method can further include determining, using the processor, a Y-direction profile of the image. The Y-direction profile includes edges of the pattern across the Y-direction. The Y-direction is perpendicular to the X-direction. In FIGS. 3, 6, and 9, the X-direction is horizontal and the Y-direction is vertical, but these directions can be reversed depending on the image and/or workpiece. Using the processor, Y-direction offsets for the workpiece between a nominal line and the profile are determined. Using the processor, a Y-direction vibration spectrum based on the Y-direction offsets are determined. A swath in the image includes more than one row in the array.

The method can include averaging the X-direction vibration spectrum and the Y-direction vibration spectrum and determining a vibration frequency for the inspection system from the averaging using the processor.

The workpiece can be a semiconductor wafer or a reticle.

A non-transitory computer readable medium can store a program configured to instruct a processor to execute some or all of the steps of the second embodiment.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Elimination of tool-induced noise can improve the signal to noise ratio of electron beam inspection images. This can be accomplished by determining parameters from an inspection image that are representative of mechanical vibrations and electromagnetic interference. Specifically, noise that is induced by such vibrations can be successfully isolated from the image using their characteristic frequency. These computed frequencies may be used as a tool diagnostic at the time of inspection tool evaluation to further characterize the source of the vibrations. For example, a low frequency noise may be induced by the wafer stage, which can affect inspection.

Embodiments disclosed herein can obtain system noise (including mechanical vibration and EMI) information from an electron beam inspection tool during electron beam swathing imaging mode to diagnose vibration-related image quality problems. In an instance, no additional equipment is installed to perform the embodiments disclosed herein. The edge detection embodiments disclosed herein can recognize pattern edges and generate time-domain and frequency domain spectra. Glitches or false edges can be determined to reduce false results caused by post-processing. Y-direction measurement (e.g., along the swathing direction) can expand bandwidth if a straight line feature is detected in swath image.

Figure 1:
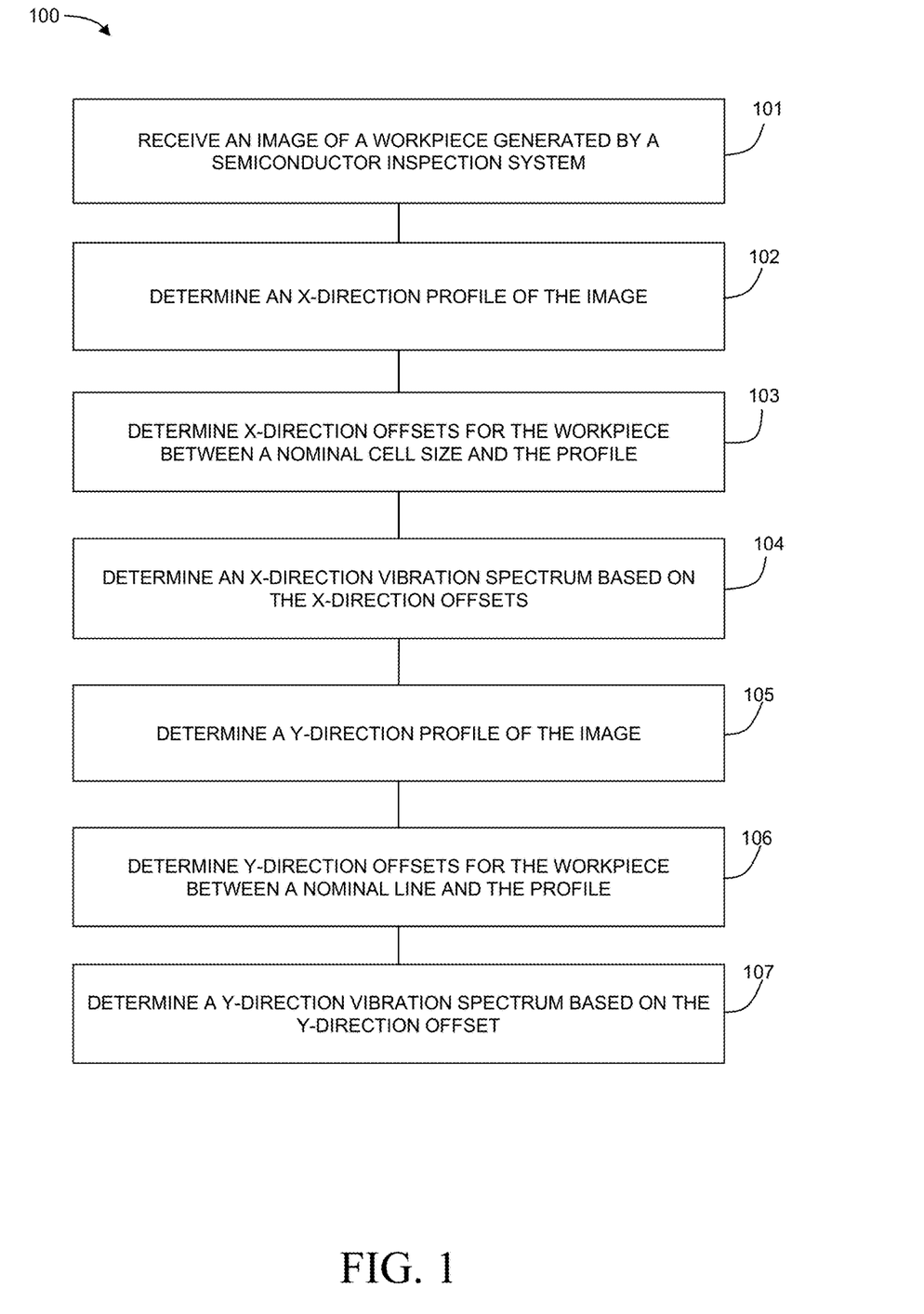
FIG. 1 is a flowchart of a method to determine a vibration frequency of an electron beam inspection tool.

FIG. 1 shows a flowchart of method 100. Some or all of the steps in method 100 can be performed by a processor. An inspection system can generate the images used in the method 100. For example, the inspection system may be scanning electron microscope (SEM) or another inspection system that uses an electron beam. The electron beam inspection tool may be configured to operate in a swath mode At 101, an image of a workpiece generated by an inspection system is received at a processor. The image can include an array of a pattern on the workpiece. In an instance, a raster scan with an electron beam inspection system is performed to acquire a swath image of array patterns on the workpiece. The workpiece can be a semiconductor wafer or a reticle.

The image can be cropped to a swath of the pattern. For example, the swath can have more than one column in the array. For example, FIG. 3 shows six columns that run in the vertical direction.

Figure 2:
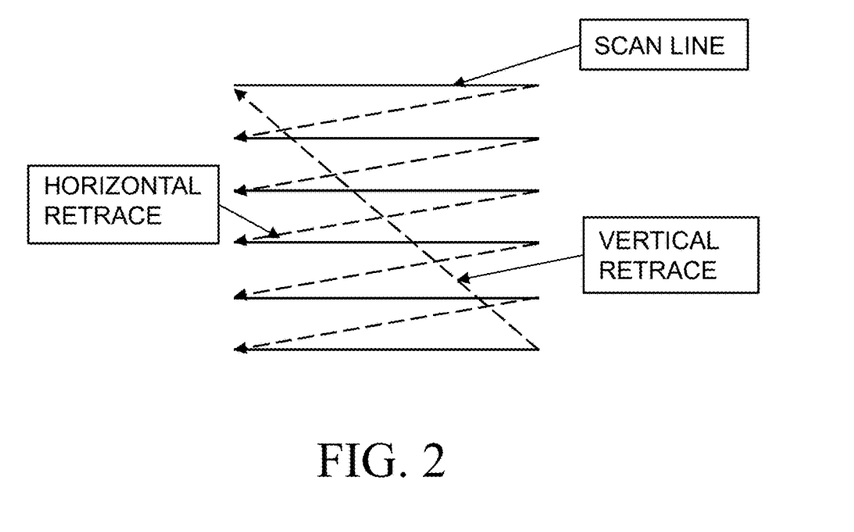
FIG. 2 is an illustration of a raster scan as described in one of the embodiments.

Swathing is an operation mode of electron beam imaging, where the electron beam is scanning in raster pattern while a stage and workpiece are moving at constant velocity to match the electron beam's scanning rate. FIG. 2 shows an exemplary illustration of a raster scan. As shown in the FIG.

2, during a raster scan, the inspection system moves on a scan line for a set distance and time before retracing to a start position of a next scan line.

Turning back to FIG. 1, an X-direction profile of the image is determined at 102. The X-direction profile includes edges of the pattern across the X-direction. The pattern may be an array of periodically repeating patterns on the workpiece. The patterns may be separated from each other by a pitch. In an embodiment, the pitch may be uniform. In another embodiment, the pitch may be irregular. FIG. 3 shows an illustration of an array pattern of a workpiece. The greyscale differences in the image can be used to create a profile and determine edge locations and/or a nominal pattern. Differences in brightness between neighboring pixels can indicate an edge of the pattern.

Image condition information and array pattern information can be determined for the image. A nominal cell size may be estimated based on the image condition information and array pattern information. These conditions can be determined through user input or from an algorithm processing the image. For example, the algorithm can acquire a swath image over certain wafer pattern with certain imaging conditions for vibration analysis, and those conditions can be stored in a format to be passed on to the analysis algorithm, A nominal peak of the raster scan can be determined for each array pattern in the nominal cell. The nominal peak can be any repeating feature that is identifiable from an acquired image. A time-domain signal of nominal peak may be generated. A Fast Fourier Transform (FFT) can be performed on the time-domain signal to obtain nominal frequency.

The image condition information can include a pixel size and/or a scan line time. The array pattern information can include a pitch between two repeating patterns. The image condition information and array pattern information may be provided manually by a user. This information also can be obtained from historical data from previous inspections.

Edge detection can be performed on the image to obtain the actual edge locations of the array patterns of the workpiece.

A nominal cell size can be determined based on the image condition information and the array pattern information. The nominal cell size may be estimated based on a predetermined number of pixels in the image. In an embodiment, the nominal cell size may be an array of individual pixels. The nominal cell size may be estimated based on the time for which each line in the raster scan is scanned before the electron beam inspection tool retraces back to the starting position of the subsequent scan. In an embodiment, one of the dimensions of the nominal cell may be a multiple of a length of the raster scan line. The nominal cell size also may be estimated based on the array pattern pitch between repeating patterns. In an embodiment of the present disclosure, the pitch may be assigned to be uniform for the estimation of nominal cell size.

Figure 4:
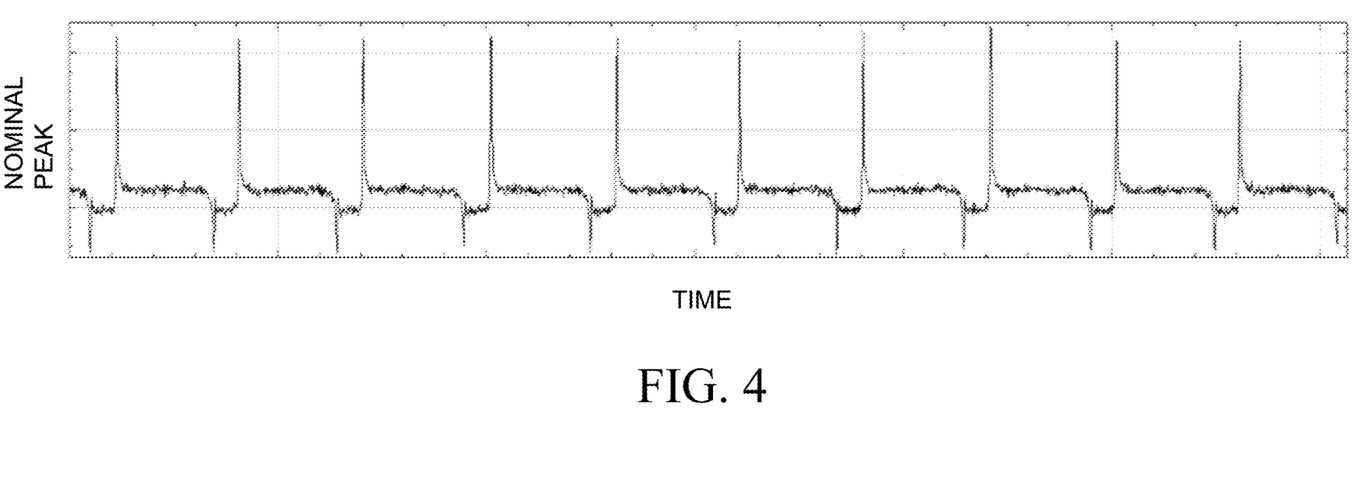
FIG. 4 shows nominal peaks of raster scan at array patterns.

A nominal peak for each array pattern of the workpiece within the nominal cell can be determined. This nominal peak may be the peak distance traveled by the inspection system in each line of the raster scan in the swath mode under nominal conditions. In an embodiment, to estimate nominal frequency and nominal peak, nominal conditions may be assumed. Accordingly, the first scan line of raster scan of the inspection system may be aligned with an edge of one of the array patterns and the array patterns may be assumed to have uniform pitch such that the deviation of each scan line of raster scan of the inspection system from the respective edge of the target array patterns may be assumed to be zero. Thus, each line of the raster scan of the electron beam inspection tool may be assumed to be aligned with an edge of one of the array patterns. FIG. 4 shows a time domain signal of a nominal peak values at the edges of array patterns over time.

Figure 5:
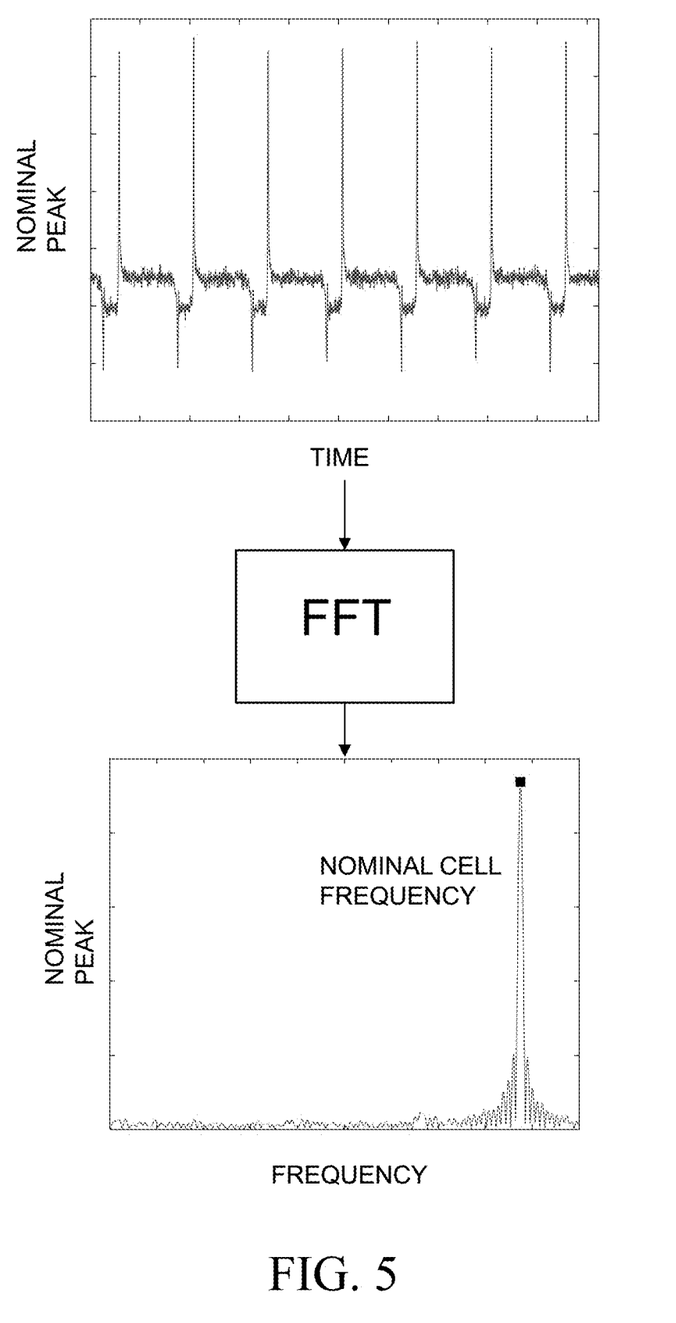
FIG. 5 shows computation of nominal frequency from nominal peak vs time signal using FFT.

A time domain signal of a nominal peak values at the edges of array patterns may be generated and an FFT may be performed to obtain the nominal frequency in the frequency domain. FIG. 5 illustrates the conversion of the time domain signal into frequency domain signal. This technique may be performed on all rows of the array patterns in the nominal cell and the resulting spectrum may be averaged to obtain the nominal frequencies.

Edge detection can be performed to determine the actual edge locations of the patterns. In an embodiment, an actual swath image of the pattern on the workpiece may be used to detect actual edges. An edge detection method may be performed to detect the edges. FIG. 6 illustrates vertical edge detection for the X-direction scan and FIG. 9 illustrates horizontal edge detection for the Y-direction scan. In an embodiment, the image may be analyzed for alternating dark and bright spots. The edge of the transition from a dark to bright or a bright to dark spots on the workpiece may be detected as the actual edges of the pattern. Subsequently, actual peaks of the scan line of the raster scan of the inspection system may be determined based on the detected edges. These actual peaks may align with some of the detected actual edges of the pattern on the workpiece.

Turning back to FIG. 1, X-direction offsets are determined for the workpiece between a nominal cell size and the profile at 103. A peak deviation of actual peaks from the nominal peaks of the array patterns may be determined. Edge deviation versus time also can be determined.

A peak deviation may be determined between the actual peaks and the nominal peaks of the array patterns. The peak deviation can be generated as a time domain signal and an FFT can be performed on the time domain signal to eliminate edge roughness to obtain the vibration frequency.

An X-direction vibration spectrum is determined at 104 based on the X-direction offsets. This can include generating a time-domain signal of the computed peak deviation and performing an FFT on it. The resultant frequency spectrum may be averaged to compute the vibration frequency. The pattern is typically uniform on the workpiece, but the vibration spectrum can affect this uniformity.

The inspection system can compare the vibration spectrum against a specification to determine if the inspection system is within tolerance or if adjustments to the inspection system are needed. The stage, enclosure, or interactions with the environment outside the inspection tool may need to be adjusted.

A similar approach to that of the X-direction can be performed in the Y-direction. The edge detection may detect vertical edges for X-direction and horizontal edges for Y-direction to determine vertical and horizontal vibrations, respectively.

A Y-direction profile of the image is determined at 105. The Y-direction profile includes edges of the pattern across the Y-direction. The Y-direction is perpendicular to the X-direction. In an instance, the swath includes more than one row in the array. For example, FIG. 6 shows four rows that run in the horizontal direction. At 106, Y-direction offsets are determined for the workpiece between a nominal cell size and the profile. A Y-direction vibration spectrum is determined at 107 based on the Y-direction offsets.

In an instance, a nominal line and deviation of actual edge points from the line can be determined after the horizontal edge points are determined. An FFT spectrum is determined and all spectrums are averaged to determine the vibration frequencies.

The method 100 can include averaging the X-direction vibration spectrum and the Y-direction vibration spectrum and determining a vibration frequency for the inspection system from the averaging using the processor.

Figure 7:
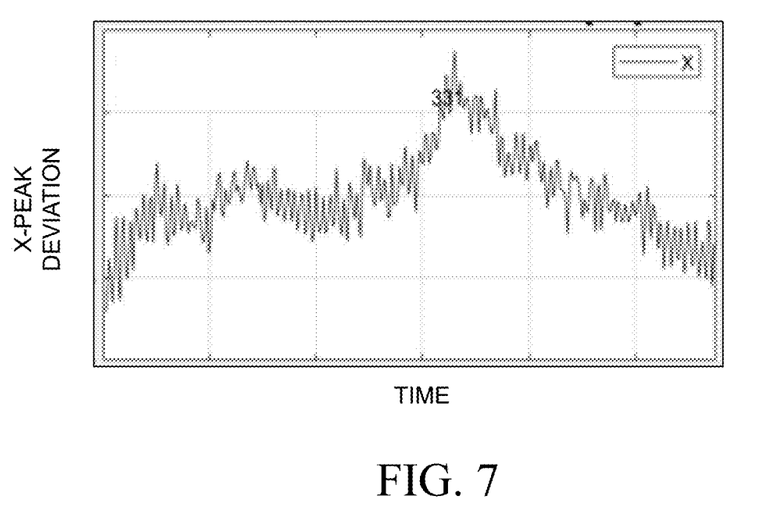
FIG. 7 shows a time-domain signal of a peak deviation in the X-direction scan versus time.
Figure 8:
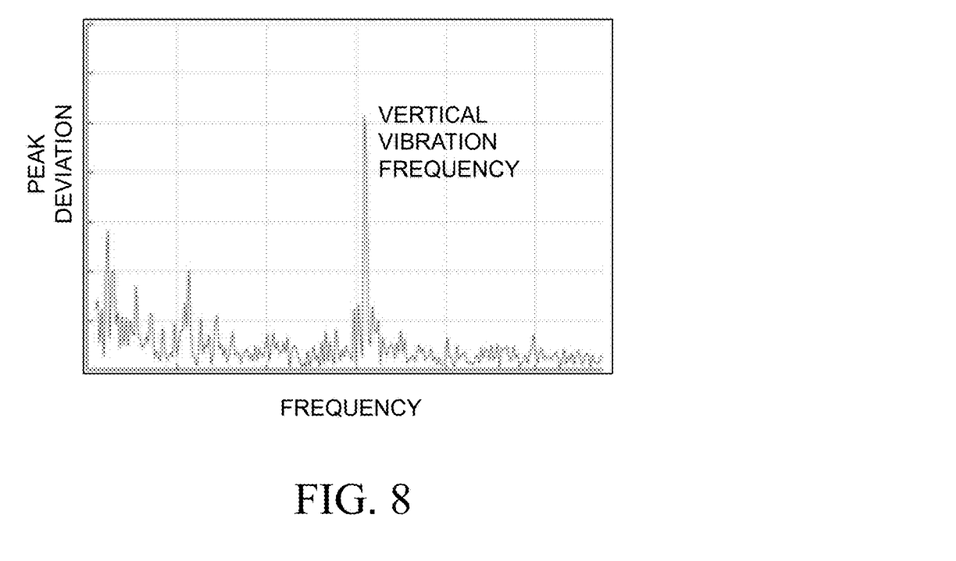
FIG. 8 shows FFT of the time-domain signal of a peak deviation in the X-direction scan versus time.

In another embodiment of the method 100, raster scan of the swath mode of the electron beam inspection tool may be performed in X-direction. In this embodiment, the edge detection, as shown in FIG. 5 is done on the vertical edges. FIG. 7 shows the time domain signal of the peak deviation in the X-direction. FIG. 8 shows the FFT spectrum of peak deviation in the X-direction. The average of the FFT spectrum provides the vertical vibration frequency of the electron beam inspection tool.

Figure 10:
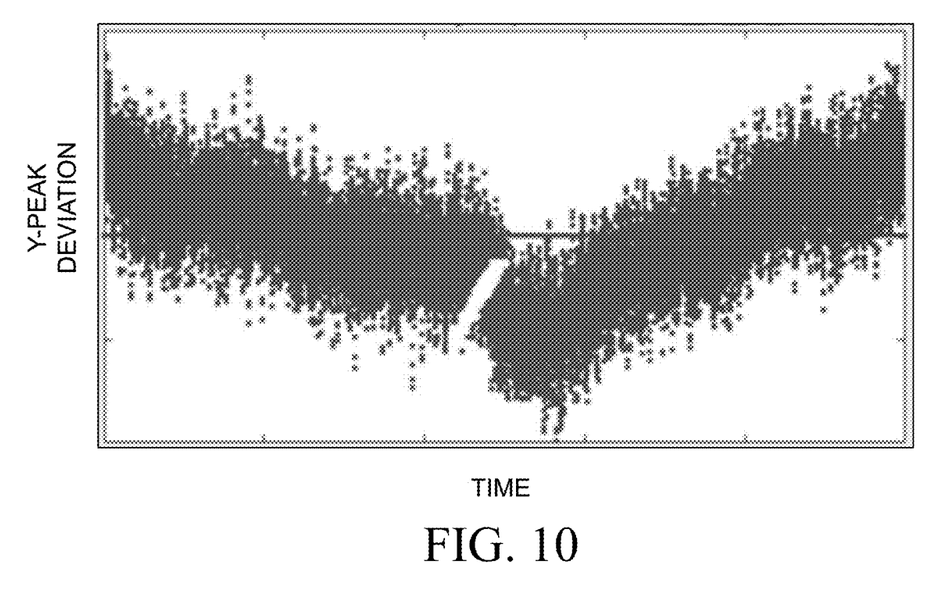
FIG. 10 shows a time-domain signal of a peak deviation in the Y-direction scan versus time.
Figure 11:
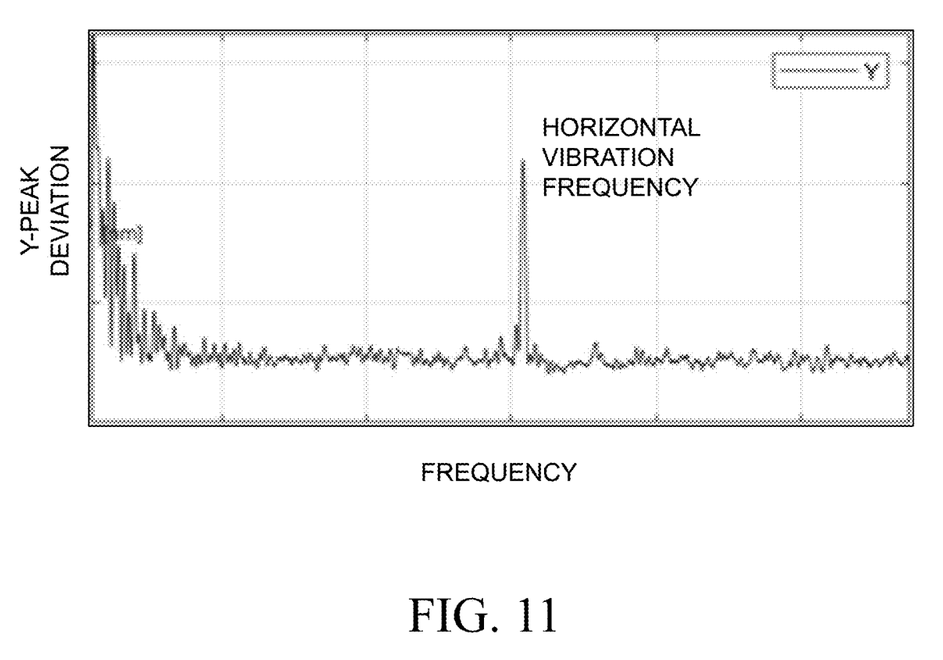
FIG. 11 shows horizontal vibration frequency over a frequency.

In another embodiment of the method 100, a raster scan of the swath mode of the electron beam inspection tool may be performed in Y-direction. In this embodiment, the edge detection, as shown in FIG. 9, is done on the horizontal edges. FIG. 10 shows the time domain signal of the peak deviation in the Y-direction. FIG. 11 shows the FFT spectrum of peak deviation in the Y-direction. The average of the FFT spectrum provides the horizontal vibration frequency of the inspection tool.

In another embodiment, an image over selected, evenly spaced markers on workpiece is obtained. Embodiments disclosed herein can be used to measure their relative location and extract frequency information.

In another embodiment, an image over an evenly spaced, alternating bright and dark area is obtained. An external oscilloscope is used to intercept raw detector signal and perform real-time analysis in a frequency domain.

The embodiments of method 100 improve the speed of detection of mechanical vibrations. The source of the vibration can be determined based on the spectrum. The frequency can be matched to entries in a library or can be correlated with resonance frequencies that correspond to the stage, chamber, column, or other components.

The embodiments of method 100 may improve the speed by up to twenty times that of the existing techniques. In an example, the speed of detection of vibration frequency was thirty seconds compared to the 10 minutes of the existing methods for detection of vibration frequency. Furthermore, since the embodiments disclosed herein us images as inputs, these embodiments are more adaptive to various patterns. Embodiments disclosed herein also have improved accuracy as the FFT computation and averaged spectrums nullify effects of input image distortion. If the underlying design on the workpiece is available, then the embodiments disclosed herein can be used for runtime modeling.

Line edge roughness (LER) effects may be mostly eliminated by averaging. For the X-direction, the edge location is determined after averaging over the height of the swath image. For the Y-direction, results are determined after averaging a number of pixels in one array pitch, which can be on the order of tens to hundreds of pixels.

While disclosed with respect to vibration, the method 100 also can be used for EMI. EMI and vibration both appear as periodic variations of the edge locations in an image. A library can include sources of EMI that can be used for matching or correlation. For example, X-direction vibration spectrum and Y-direction vibration spectrum can refer to tool vibration and/or EMI because the vibration affecting the image can have various causes in the inspection system.

When qualifying an inspection system with swathing functionality, embodiments disclosed herein can be used as a diagnostic to measure the whole inspection system's noise level during operation and to provide information (e.g., frequency and amplitude) for troubleshooting. During normal inspection tool operation, embodiments disclosed herein can be run periodically (e.g., online or offline) to check images for noise baseline and signature and for inspection tool health monitoring. For example, the flow rate of cooling water and/or air, the tuning of the isolation system and/or wafer stage, or the sensor location or gain parameters of the EMI cancellation system can be changed.

Figure 12:
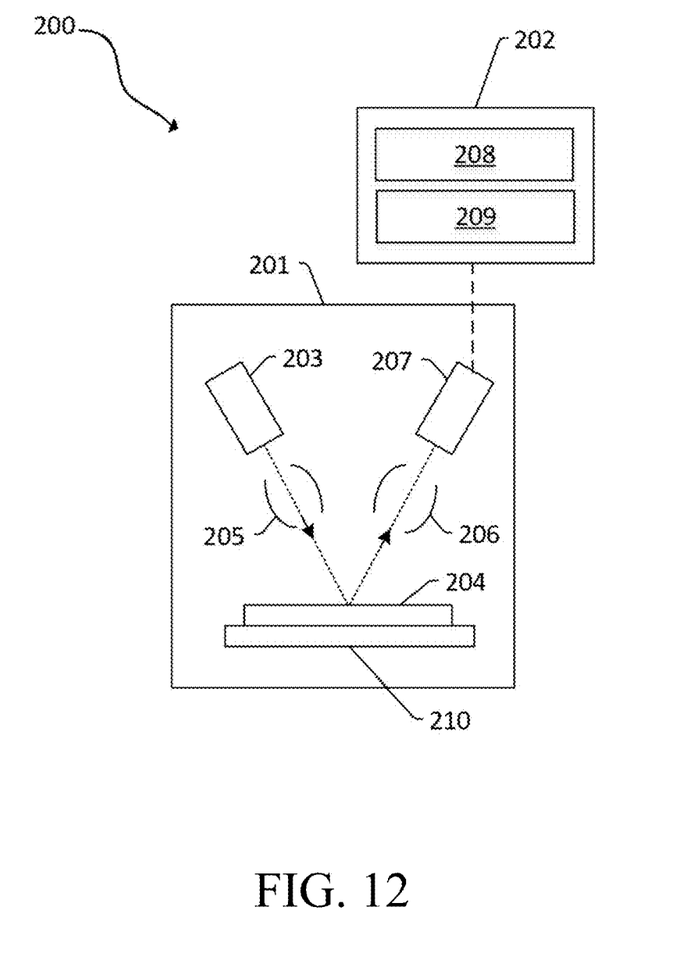
FIG. 12 is an embodiment of an inspection system in accordance with the present disclosure.

FIG. 12 is a block diagram of an embodiment of an inspection system 200. The inspection system 200 includes a workpiece inspection tool (which includes the electron column 201) configured to generate images of a workpiece 204.

The inspection system includes an output acquisition subsystem that includes at least an energy source and a detector. The output acquisition subsystem may be an electron beam-based output acquisition subsystem. For example, in one embodiment, the energy directed to the workpiece 204 includes electrons, and the energy detected from the workpiece 204 includes electrons. In this manner, the energy source may be an electron beam source. In one such embodiment shown in FIG. 12, the output acquisition subsystem includes electron column 201, which is coupled to computer subsystem 202. A stage 210 may hold the workpiece 204.

As also shown in FIG. 12, the electron column 201 includes an electron beam source 203 configured to generate electrons that are focused to workpiece 204 by one or more elements 205. The electron beam source 203 may include, for example, a cathode source or emitter tip. The one or more elements 205 may include, for example, a gun lens, an anode, a beam limiting aperture, a gate valve, a beam current selection aperture, an objective lens, and a scanning subsystem, all of which may include any such suitable elements known in the art.

Electrons returned from the workpiece 204 (e.g., secondary electrons) may be focused by one or more elements 206 to detector 207. One or more elements 206 may include, for example, a scanning subsystem, which may be the same scanning subsystem included in element(s) 205.

The electron column 201 also may include any other suitable elements known in the art.

Although the electron column 201 is shown in FIG. 12 as being configured such that the electrons are directed to the workpiece 204 at an oblique angle of incidence and are scattered from the workpiece 204 at another oblique angle, the electron beam may be directed to and scattered from the workpiece 204 at any suitable angles. In addition, the electron beam-based output acquisition subsystem may be configured to use multiple modes to generate images of the workpiece 204 (e.g., with different illumination angles, collection angles, etc.). The multiple modes of the electron beam-based output acquisition subsystem may be different in any image generation parameters of the output acquisition subsystem.

Computer subsystem 202 may be coupled to detector 207 as described above. The detector 207 may detect electrons returned from the surface of the workpiece 204 thereby forming electron beam images of the workpiece 204. The electron beam images may include any suitable electron beam images. Computer subsystem 202 may be configured to perform any of the functions described herein using the output of the detector 207 and/or the electron beam images. Computer subsystem 202 may be configured to perform any additional step(s) described herein. A system 200 that includes the output acquisition subsystem shown in FIG. 12 may be further configured as described herein.

It is noted that FIG. 12 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The system 200 can include other components, such as a cooling system, an isolation system, sensors, or an EMI cancellation system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 12 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The computer subsystem 202 includes a processor 208 and an electronic data storage unit 209. The processor 208 may include a microprocessor, a microcontroller, or other devices.

The computer subsystem 202 may be coupled to the components of the system 200 in any suitable manner (e.g., via one or more transmission media, which may include wired and/or wireless transmission media) such that the processor 208 can receive output. The processor 208 may be configured to perform a number of functions using the output. The inspection system can receive instructions or other information from the processor 208. The processor 208 and/or the electronic data storage unit 209 optionally may be in electronic communication with another inspection system, a metrology system, or a review system (not illustrated) to receive additional information or send instructions.

The processor 208 is in electronic communication with the inspection system, such as the detector 207. The processor 208 may be configured to process images generated using measurements from the detector 207. For example, the processor may perform embodiments of the method 100 or method 200.

The computer subsystem 202, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 208 and electronic data storage unit 209 may be disposed in or otherwise part of the system 200 or another device. In an example, the processor 208 and electronic data storage unit 209 may be part of a standalone control unit or in a centralized quality control unit. Multiple processors 208 or electronic data storage units 209 may be used.

The processor 208 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 208 to implement various methods and functions may be stored in readable storage media, such as a memory in the electronic data storage unit 209 or other memory. The electronic data storage unit 209 or other memory also can include the library of tool vibration and EMI sources.

If the system 200 includes more than one computer subsystem 202, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 208 may be configured to perform a number of functions using the output of the system 200 or other output. For instance, the processor 208 may be configured to send the output to an electronic data storage unit 209 or another storage medium. The processor 208 can be configured to perform some or all of the steps of method 100 or other embodiments disclosed herein. The processor 208 may be further configured as described herein.

The processor 208 may be communicatively coupled to any of the various components or sub-systems of system 200 in any manner known in the art. Moreover, the processor 208 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 208 and other subsystems of the system 200 or systems external to system 200.

An additional embodiment relates to a non-transitory computer-readable medium storing program instructions executable on a controller for performing a computer-implemented method 100, as disclosed herein. In particular, as shown in FIG. 12, electronic data storage unit 209 or other storage medium may contain non-transitory computer-readable medium that includes program instructions executable on the processor 208. The computer-implemented method may include any step(s) of any method(s) described herein, including method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

The workpiece can be, for example, a semiconductor wafer or reticle. As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Other workpieces can be used with techniques and systems disclosed herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a particle beam source that generates a beam of particles;
   a stage configured to hold a workpiece in a path of the beam of particles;
   a detector configured to receive the beam of particles reflected from the workpiece; and
   a processor in electronic communication with the detector, wherein the processor is configured to:
      receive an image of a workpiece, wherein the image includes an array of a pattern on the workpiece;
      determine an X-direction profile of the image, wherein the X-direction profile includes edges of the pattern across the X-direction;
      determine X-direction offsets for the workpiece between a nominal cell size and the profile; and
      determine an X-direction vibration spectrum based on the X-direction offsets.

2. The system of claim 1, wherein the particles are electrons.

3. The system of claim 1, wherein the processor is further configured to crop the image to a swath of the pattern.

4. The system of claim 3, wherein the swath in the image includes more than one column in the array.

5. The system of claim 1, wherein the processor is further configured to:
   determine a Y-direction profile of the image, wherein the Y-direction profile includes edges of the pattern across the Y-direction, and wherein the Y-direction is perpendicular to the X-direction;
   determine Y-direction offsets for the workpiece between a nominal line and the Y-direction profile; and
   determine a Y-direction vibration spectrum based on the Y-direction offsets.

6. The system of claim 5, wherein a swath in the image includes more than one row in the array.

7. The system of claim 5, wherein the processor is further configured to average the X-direction vibration spectrum and the Y-direction vibration spectrum.

8. The system of claim 7, wherein the processor is further configured to determine a vibration frequency for the system from the averaging.

9. The system of claim 1, wherein the workpiece is a semiconductor wafer or a reticle.

10. A method comprising:
    receiving at a processor an image of a workpiece generated by an inspection system, wherein the image includes an array of a pattern on the workpiece;
    determining, using the processor, an X-direction profile of the image, wherein the X-direction profile includes edges of the pattern across the X-direction;
    determining, using the processor, X-direction offsets for the workpiece between a nominal cell size and the profile; and
    determining, using the processor, an X-direction vibration spectrum based on the X-direction offsets.

11. The method of claim 10, further comprising generating the image using the inspection system.

12. The method of claim 10, wherein the inspection system is a scanning electron microscope.

13. The method of claim 10, further comprising cropping the image to a swath of the pattern using the processor.

14. The method of claim 13, wherein the swath in the image includes more than one column in the array.

15. The method of claim 10, further comprising:
    determining, using the processor, a Y-direction profile of the image, wherein the Y-direction profile includes edges of the pattern across the Y-direction, and wherein the Y-direction is perpendicular to the X-direction;
    determining, using the processor, Y-direction offsets for the workpiece between a nominal line and the Y-direction profile; and
    determining, using the processor, a Y-direction vibration spectrum based on the Y-direction offsets.

16. The method of claim 15, wherein a swath in the image includes more than one row in the array.

17. The method of claim 15, further comprising averaging the X-direction vibration spectrum and the Y-direction vibration spectrum and determining a vibration frequency for the inspection system from the averaging using the processor.

18. The method of claim 10, wherein the workpiece is a semiconductor wafer or a reticle.

19. A non-transitory computer readable medium storing a program configured to instruct a processor to execute the method of claim 10.

20. A non-transitory computer readable medium storing a program configured to instruct a processor to execute the method of claim 15.

* * * * *